(12) United States Patent
Muotio

(10) Patent No.: US 11,371,832 B2
(45) Date of Patent: Jun. 28, 2022

(54) DEVICE AND METHOD FOR CONTACTLESS THICKNESS MEASUREMENT OF A PLANAR OBJECT

(71) Applicant: VALMET AUTOMATION OY, Espoo (FI)

(72) Inventor: Toni Muotio, Tampere (FI)

(73) Assignee: VALMET AUTOMATION OY, Espoo (FI)

( * ) Notice: Subject to any disclaimer, the term of this patent is extended or adjusted under 35 U.S.C. 154(b) by 0 days.

(21) Appl. No.: 17/323,463

(22) Filed: May 18, 2021

(65) Prior Publication Data
US 2021/0278200 A1 Sep. 9, 2021

Related U.S. Application Data

(63) Continuation of application No. PCT/FI2019/050734, filed on Oct. 14, 2019.

(30) Foreign Application Priority Data

Dec. 21, 2018 (FI) ...................................... 20187188

(51) Int. Cl.
*G01B 11/06* (2006.01)
*G01B 11/02* (2006.01)
*G01B 11/24* (2006.01)

(52) U.S. Cl.
CPC ........ *G01B 11/0616* (2013.01); *G01B 11/028* (2013.01); *G01B 11/0691* (2013.01); *G01B 11/2433* (2013.01)

(58) Field of Classification Search
CPC ............................ G01B 11/0691; G01B 11/14
See application file for complete search history.

(56) References Cited

U.S. PATENT DOCUMENTS

| 5,210,593 A | 5/1993 | Kramer |
| 6,281,679 B1 * | 8/2001 | King ...................... G01B 7/107 324/226 |

(Continued)

FOREIGN PATENT DOCUMENTS

| EP | 0486713 A1 | 5/1992 |
| EP | 1118835 A1 | 7/2001 |

(Continued)

OTHER PUBLICATIONS

Feb. 3, 2020 International Search Report issued in International Patent Application No. PCT/FI2019/050734.

(Continued)

*Primary Examiner* — Michael P LaPage
(74) *Attorney, Agent, or Firm* — Oliff PLC

(57) ABSTRACT

A measuring device for measuring thickness of a planar object, where the measuring device comprises a first optical sensor module and a second optical sensor module that located on opposites of the measured planar object with mutual distance the optical sensor modules having at least one light source, a reference shade with two dimensional pattern and an imaging sensor and computing equipment, where the one light source is set to an angle towards measured object and the reference shade is set between the light and the object so that a shadow forms on the surface of the object and the imaging sensor is set so it can detect the reference shade and the shadow while the computing equipment calculates the distance between the surface of the object and sensor module from the distance between the detected shade and shadow of both optical modules and calculate the thickness of the object.

13 Claims, 5 Drawing Sheets

(56) References Cited

U.S. PATENT DOCUMENTS

Figure 1:
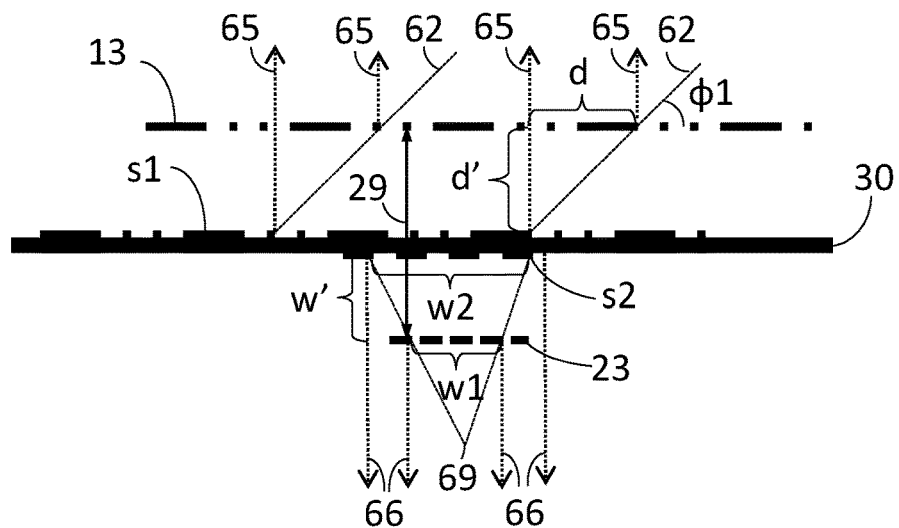

| | | | |
|---|---|---|---|
| 7,477,388 B1* | 1/2009 | Liphardt | G01N 21/211 |
| | | | 356/364 |
| 9,291,573 B2* | 3/2016 | Baych | G01B 11/0691 |
| 2012/0013879 A1* | 1/2012 | Den Boef | G03F 9/7088 |
| | | | 355/67 |
| 2013/0128247 A1* | 5/2013 | Khuat Duy | G03F 9/7034 |
| | | | 355/63 |
| 2017/0284788 A1* | 10/2017 | Kannaka | G01B 7/08 |
| 2020/0393238 A1* | 12/2020 | Zhuang | G01B 11/245 |

FOREIGN PATENT DOCUMENTS

| | | |
|---|---|---|
| EP | 2685208 A2 | 1/2014 |
| EP | 3306266 A1 | 4/2018 |
| JP | H08-114420 A | 5/1996 |
| JP | 2003-65725 A | 3/2003 |
| JP | 2016-45180 A | 4/2016 |
| WO | 2009/028956 A1 | 3/2009 |
| WO | 2015/128353 A1 | 9/2015 |

OTHER PUBLICATIONS

Feb. 3, 2020 Written Opinion issued in International Patent Application No. PCT/FI2019/050734.
Jun. 25, 2019 Finnish Office Action issued in Finnish Patent Application No. 20187188.
Search Report is issued in Finnish Patent Application No. 20187188.

* cited by examiner

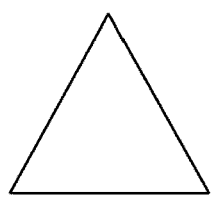
FIG. 5a
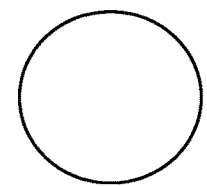
FIG. 5b
FIG. 5c
FIG. 5d
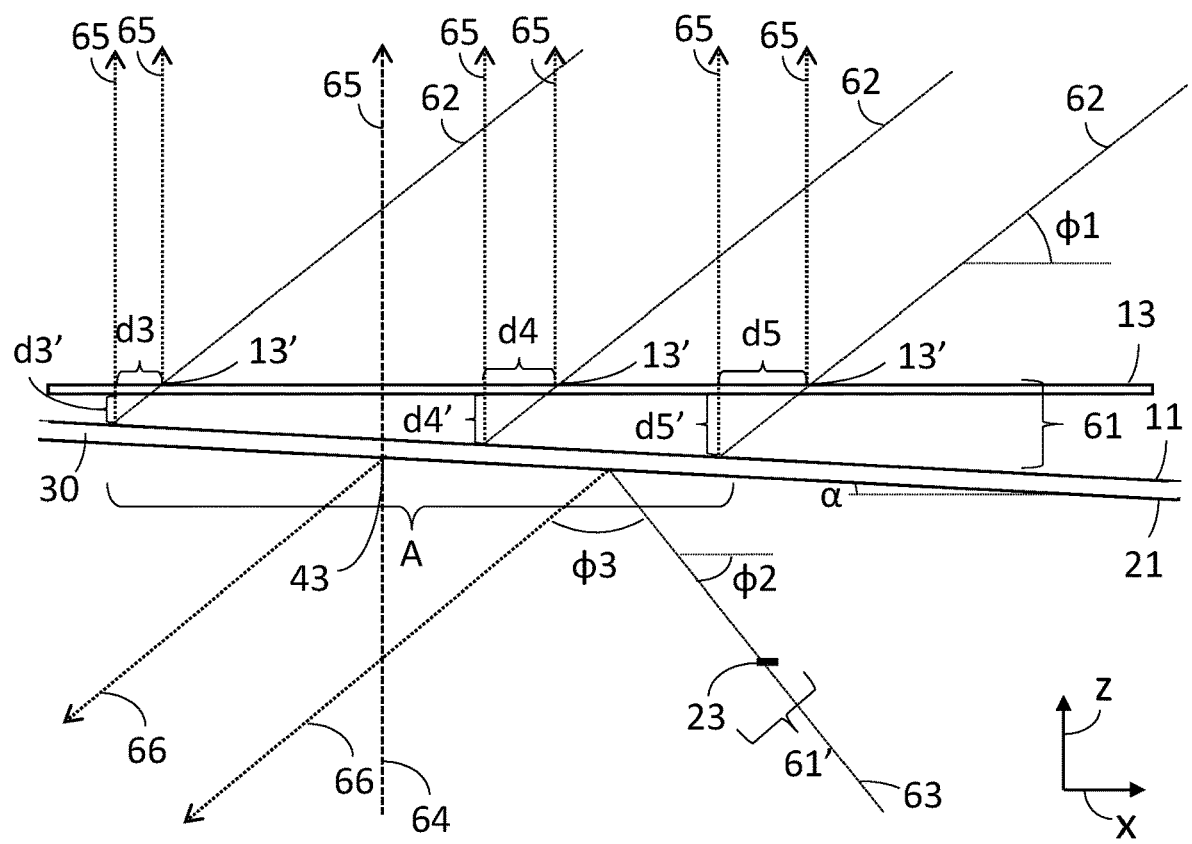
FIG. 6

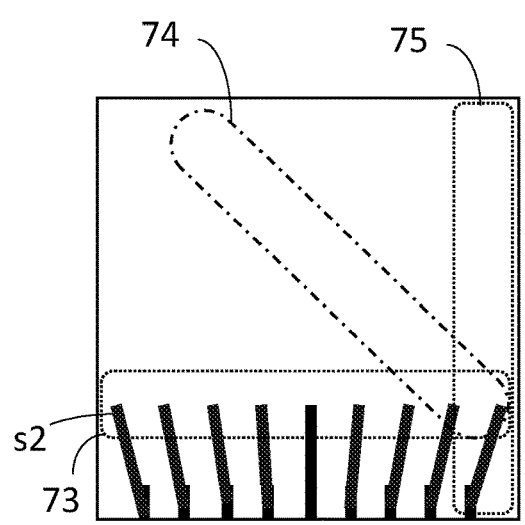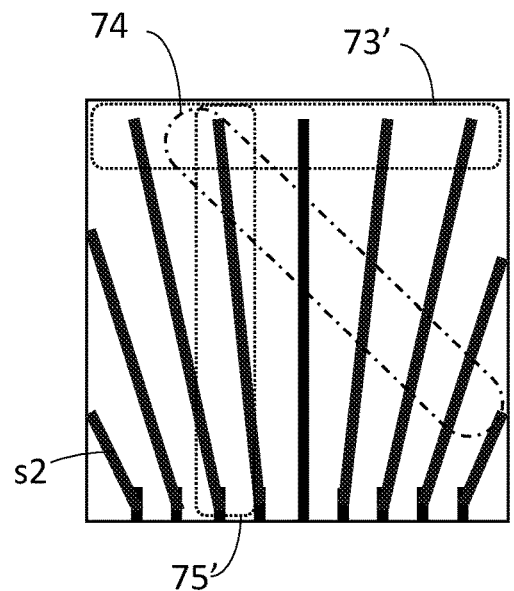
FIG. 7a
FIG. 7b
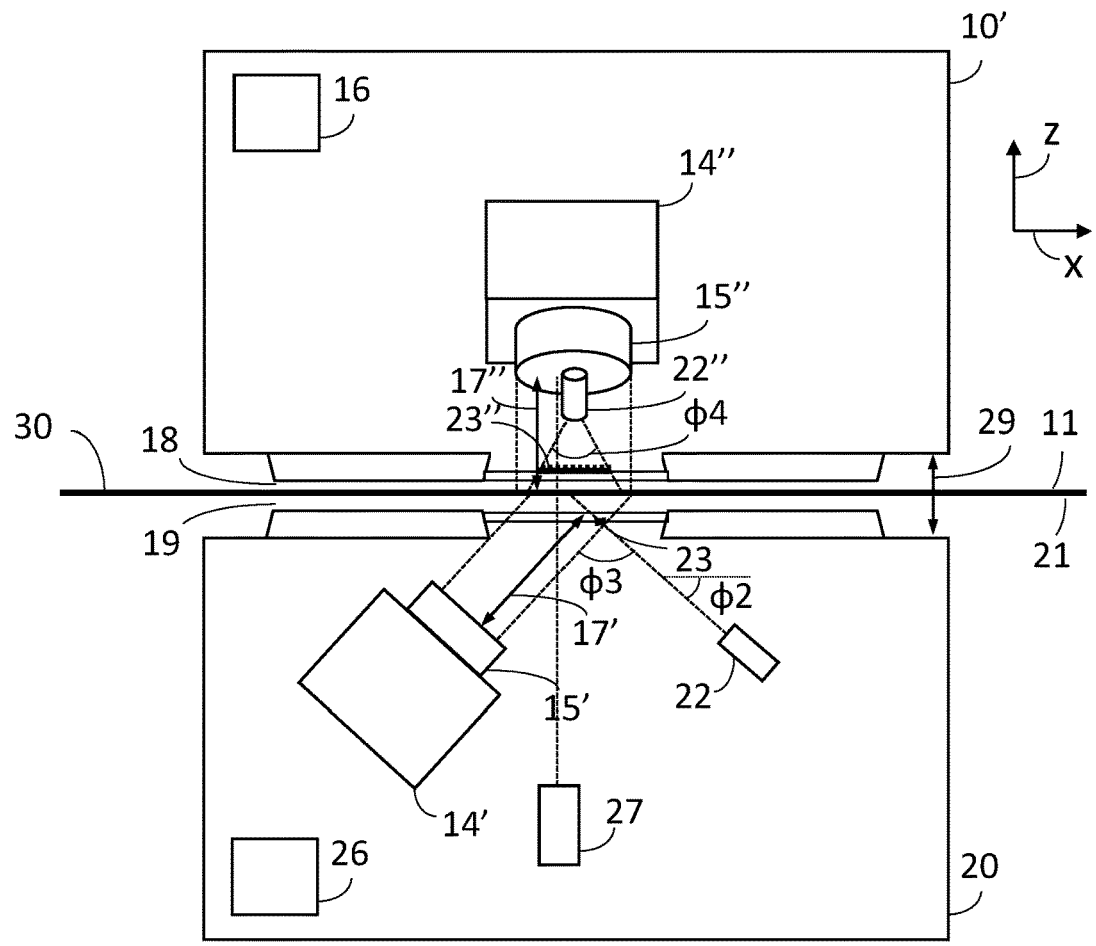
FIG. 8

DEVICE AND METHOD FOR CONTACTLESS THICKNESS MEASUREMENT OF A PLANAR OBJECT

FIELD

The present invention relates to a device and method for optical measuring of thickness of thin planar objects. Measured planar objects are such as paper, tissue, board, film and plastic.

BACKGROUND

Manufacturing of planar objects such as paper, tissue, board, film and plastic is typically done in continuous process. There are multiple places where the measurement of the product is needed. One of the measurements is the thickness of the product. Thickness can be measured in different ways. A typical way to measure the thickness is to mechanically measure the distance from measurement devices to the surface of the planar object from both sides of the planar object and subtracting the result from known distance between measurement devices.

Another approach is to use radiation sources and measure the radiation that passes through the object and calculate the thickness by knowing the density. The approach has problems. The radioactive sources may be prohibited on some sites and the accuracy may not be good enough due to density variations. The density of paper products is rarely so constant that the measurement using radiation is too inaccurate.

When the thickness is measured using distance from both sides of the object there are several ways to measure the distance. A typical way is to have a glide or shoe that touches the measured surface and the movements of the glide or shoe are measured. This approach has many problems with tear and wear of the measured surface and buildup of contaminants on the contacting elements.

The distance may also be measured contactless from both sides of the object. Here different laser based solutions are invented. E.g. the EP486713 describes a gauge for measuring unsupported web with triangulation sensors attached on a frame both sides of the web. This contactless measurement provides a point measurement without information on inclination angles of the web. This causes big uncertainties with the accuracy.

Other similar approaches with optics based solutions carry following problems: the slight movements of optics used to guide the light and detectors caused by vibrations or temperature changes; the un-linearities of the optics; misalignment of light sources; synchronization of the measurement in both sides of the object. All these affect notably when the measurement accuracy is needed in micrometer level. There is a need to have an accurate contactless thickness measurement that can handle above mentioned problems.

BRIEF DESCRIPTION

The present invention seeks to describe device and method for improved contactless thickness measurement of thin planar object. This is achieved with device as described in claim 1 and method as described in claim 8.

There are many advantages with the invention. Minimizing the effect of heat expansion and vibration within measurement device, managing the effect of unlinear optics or misaligned light sources and having synchronized distance measurement in both sides of the object.

LIST OF DRAWINGS

Figure 2:
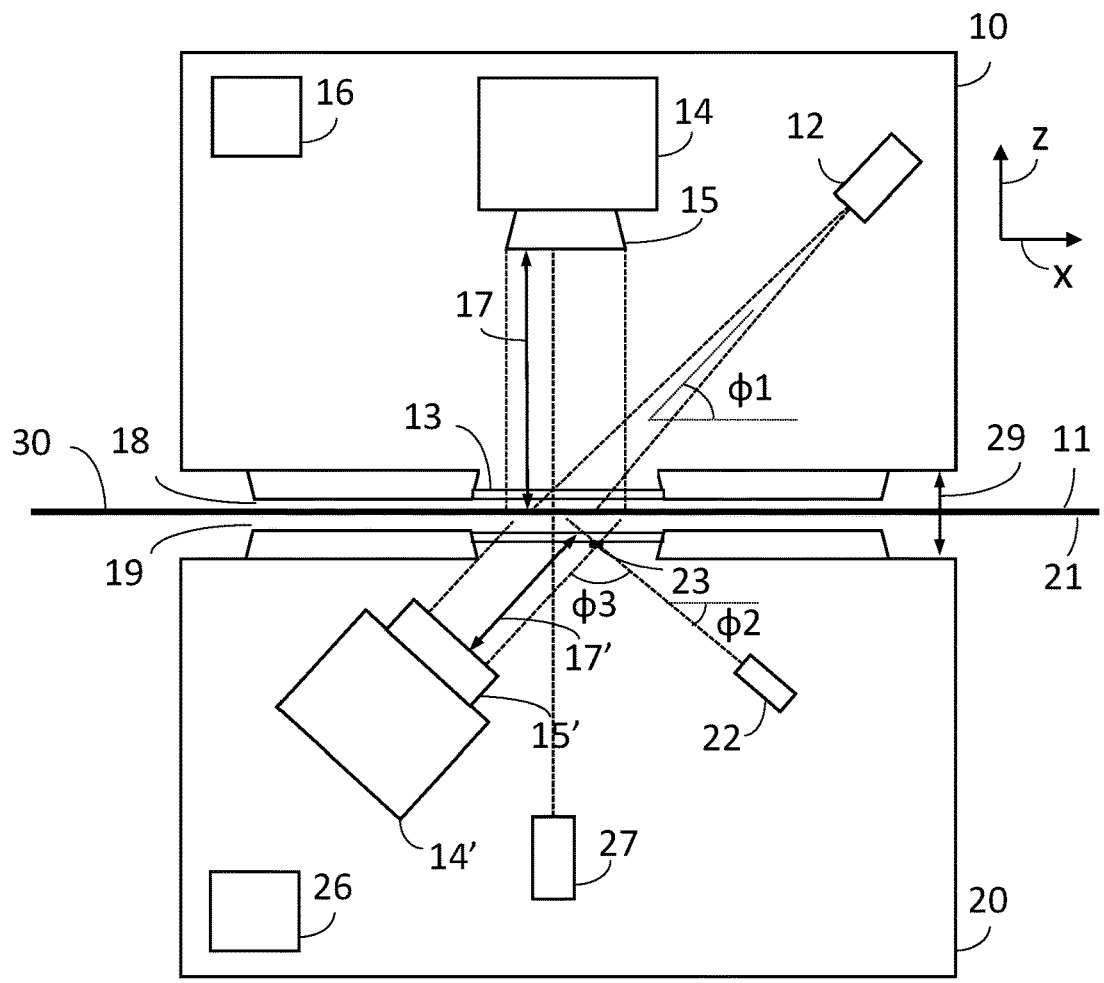
Figure 3:
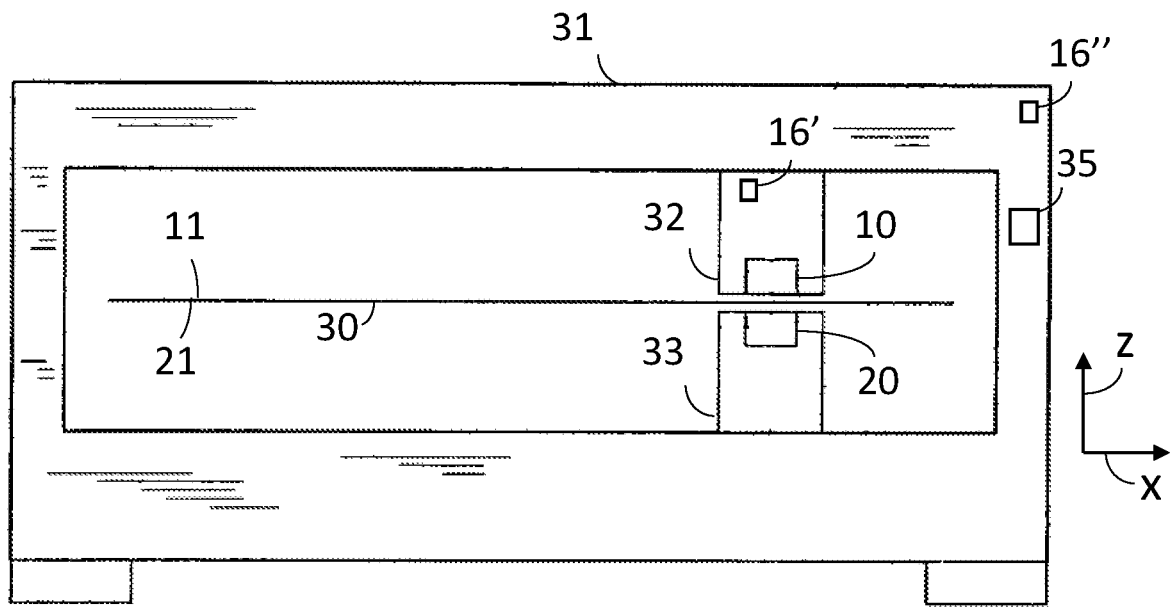
Figure 4:
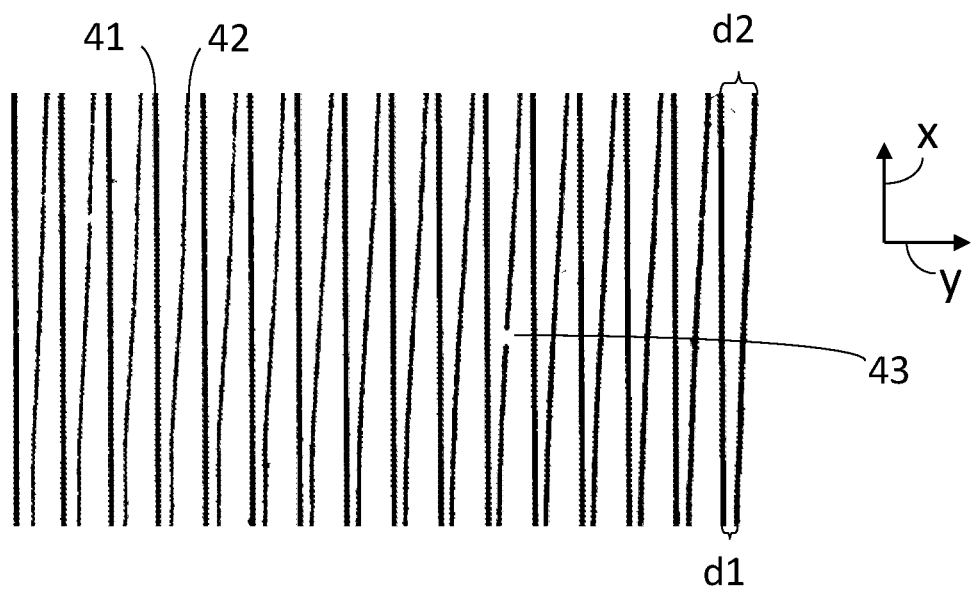
Figure 9:
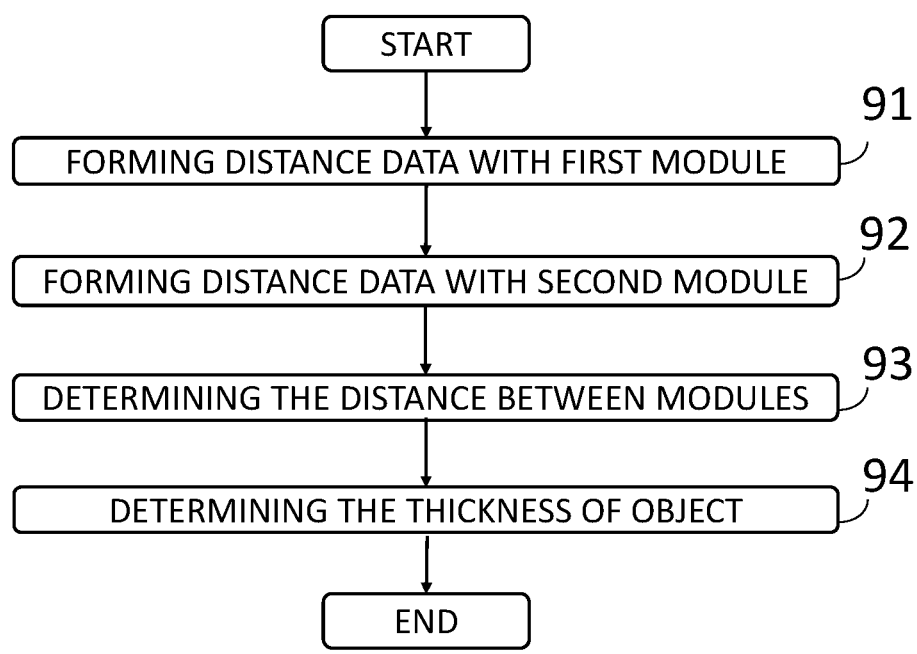

Example embodiments of the present invention are described below, by way of example only, with reference to the accompanying drawings, in which FIG. 1 shows the measurement principle; and
FIG. 2 shows one embodiment of measurement device; and
FIG. 3 shows a frame used with the measurement; and
FIG. 4 shows an image used to measure distance; and
FIGS. 5a, 5b, 5c and 5d show exemplary shade patterns; and
FIG. 6 shows magnification of the invention; and
FIGS. 7a and 7b show images used to measure distance; and
FIG. 8 shows another embodiment of measurement device; and
FIG. 9 shows a method of the invention.

DESCRIPTION OF EMBODIMENTS

The invention uses two optical sensor modules to measure distance from the measured object. The invention is based on use of reference shade and lighting to produce shadow on planar object. The reference shade and shadow are imaged and distance from the measured plane is calculated using the distance of the reference shade and the shadow. Using additional distance measurement on the other side of planar object, it is possible to determine the thickness of the object when knowing the distance between the optical sensor modules.

FIG. 1 shows the principle of the measurement. On the top side of the measured object 30 substantially linear light 62 is directed towards the measured object. A reference shade 13 is set parallel to the measured object. The light is set to pass the shade with angle $\varphi 1$. A shadow s1 is formed on the measured object. The shade and the shadow can be seen 65 simultaneously. The vertical distance d' between the shade and the shadow is proportional to the distance d between the shade and the shadow seen from the top. The distance can be calculated by $d'=d*\tan \varphi 1$. On the opposite side of the measured object 30 a shade 23 that is set close to the measured object is lighted 69 so that a shadow s2 is formed on the measured object. The shade and the shadow can be seen 66 simultaneously. The distance w' is proportional to the ratio of the width of the shade w1 and the width of the shadow w2. The distance w' can be calculated to all distances after the ratio is calibrated with at least one known measured distance. Knowing the distance 29 between the shades provides possibility to calculate the thickness of the planar object by subtracting the measured distances from the known distance 29.

The optical sensor module 10 for distance measurement of planar object comprises of light source 12, reference shade 13, imaging sensor 14, possible optical elements 15 and computing equipment 16. It may also comprise means to keep the planar object in constant distance from the module. All these are described in detail in following paragraphs.

The light source 12, 22, 22" can be an LED light, laser light or any other method to produce bright light. The light can be further focused or shaped to illuminate the reference shade with directional light. The light source may produce a wide bandwidth light or light with dedicated bandwidth. The light can be visible, infrared or ultraviolet depending on the imaging sensor used. The light with shorter wavelengths are preferable due to more accurate imaging available. The light may be produced in pulses with interval of 5-100 ms. and duration of 0.1-100 µs. The duration and interval of the pulses are controlled with computing equipment 16 or separate electronics.

The reference shade 13, 23, 23" can be wires, bars, printed or otherwise processed film, glass with paint or oxidization or some other form of obstacle for light. The shade forms a shading pattern that can also be found as a shadow on the measured surface. This pattern can be three or more dots, lines, or any other 2-dimensional pattern. Examples of shades are shown in FIGS. 5a, 5b, 5c and 5d. The lines as in FIG. 5a can be lines can be 0.001 mm-1 mm wide. The dots as in FIG. 5b can be 0,001 mm-1 mm in diameter located 0.1 mm-5 mm apart of each other. The 2D pattern can be any form that has at least two dimensions. The reference shade may comprise patterns with different colors. The two dimensional pattern provides two dimensional shadow that enable the detection of inclination of the measured surface.

In an embodiment, two or more light sources 12 are installed into the module to illuminate the same target. These light sources can be installed so that there are different angles φ1 or orientation in x,y plane for the light. Two or more light sources lighting the reference shade 13 provide two or more shadows. Different light sources provide illumination with different wavelengths and thus the shadows can be distinguished by selecting different colors from the images captured by the imaging sensor. E.g. blue and green colors can be used simultaneously. Additional light sources provide more combinations of shades and shadows and thus more accurate measurement. Different light sources may also be lit with different timing. This way the lights do not disturb each other.

The imaging sensor 14, 14', 14" can be a complementary metal-oxide-semiconductor (CMOS), N-type metal-oxide-semiconductor (NMOS), semiconductor charge-coupled devices (CCD) or Quanta Image Sensor (QIS). The imaging sensor may detect visible wavelengths, ultraviolet or additionally near infrared wavelengths. The imaging sensor converts the image into electrical signals corresponding the image. The imaging sensor has resolution of 1-15 megapixels, with a size of 17 mm$^2$-1000 mm$^2$.

There can be additional optical elements 15, 15', 15" between the imaging sensor and the imaging target. The optical elements such as lenses are used to focus the imaging sensor or provide different focal length for the imaging sensor. The optical elements such as optical filters may also be used for polarization or filtering of the light. The elements such as mirrors and prisms may also be used to divert the light so that imaging sensor can be facing to other direction than directly to imaging target. The optical elements may be attached to imaging sensor or to other parts of the module.

The imaging sensor and possible optical elements provide a focal length 17, 17', 17" where sharp images can be captured. The focus area 61, 61' is typically 0.5-2.5 mm depending on used imaging sensor and optical elements and that is a typically restricting factor for the distance between the shade 13 and the measured plane 11.

The computing equipment 16, 26 is one or more microprocessors, Field Programmable Gate Arrays (FPGA) or similar processors and memory, with software capable of distinguishing the shade and the shadow and measure the distance between shade and the shadow from the captured image. The computing equipment is connected to the imaging sensor. Since the shade is static it can be done well detectable by the software. Its location in the image is also very stable and thus minor movements can be pre-programmed to the detection algorithm. The detection of the shadow from the image can be accomplished with several ways. One way is pure edge detection of the shadow. Additionally, looking for the center point of the shadow provides good point for distance calculation. This can be found by detecting the edges of the shadow and looking for the midpoint. If the edges are not clearly visible the midpoint can also be found by applying curve describing the illumination of the image and looking the zero derivate on the area of the shadow. This way the location of the shadow can also be determined even if the resolution of the imaging sensor is not very high. There are multiple known feature detection algorithms for image extracting e.g. Canny edge detector, Sobel filter or Förstner detector. Any other appropriate feature detection algorithm can be used. Additionally, if shade with linear patterns are used, then curve fitting algorithms may be used to detect the possibly smooth shadow. Once the shadow is detected the distance between appropriate shade and its shadow is measured. The shade can be designed so that there is no doubt about correlation between shade and shadow.

The distance between shade and shadow is measured in all visible area A. This approach provides a full shadow that is distorted according to the distance differences. The software finds these distortions and calculates whether there is inclination with the measured plane. If inclination is found, its effect to the thickness measurement can be deducted. The distance calculation can be done purely mathematically by knowing the angle φ1, φ2, φ3 or more preferably by using calibration data as basis.

The software may also be programmed to measure the length of the shadows. This length may also be used for the calculation of the distance. The software may also be programmed to detect winding lines with the shadows. These may reveal uneven surface. The calculated distance data can be stored in local volatile or non-volatile memory.

The location of needed computing equipment is not restricted. They may be integrated within the optical sensor module 10, 20 or they may locate anywhere else within network connection so that the electrical signals from the imaging sensor may be processed. The computing equipment may be distributed 16', 16" within the sensor carriage 32, 33 or the frame 31. The reason to move the computing equipment outside of the module chassis may be due to temperature issues or space required. There can be additional user interface 35 for controlling, monitoring and calibrating the sensor arrangement. The computing equipment comprise also network communication interface such as Ethernet interface or industrial fieldbus interface. This interface can be used to connect the measurement arrangement to automation system.

The optical sensor module 10, 20 may also comprise of means to keep the planar object in usable constant distance 18, 19 from the optical sensor modules. These may include air jets from both sides of the planar object. Also, other airflow-based solutions can be used to keep the measured object substantially stable in z direction. The target of these means is to keep the distance of the measured surface 11, 21 within the optical focus area of the focal length 17.

Measurement device for thin planar object requires distance measurement modules mutually arranged to both sides of the object. The distance between the modules must be known.

FIG. 2 shows a measurement device where two optical sensor modules 10, 20 are arranged mutually opposite on both sides of the measured planar object 30. The optical sensor module 10 has an imaging sensor 14 with optical elements 15 providing it a focal length 17. The focus covers the measured object and a shade set close to the object. The reference shade 13 with shading pattern is set so that the imaging sensor can detect the shading pattern and the measured object simultaneously with a measurement area A of 10 mm2-400 m2. A light source 12 is set to an angle φ1 that is 10°-80° preferably 45°, providing effectively linear light beam that lights the shade and creates shadow on top of the surface 11 of the measured object. The module 20 has an imaging sensor 14' with optical elements 15' providing it a focal length 17'. The imaging sensor and the optical elements are set on an angle φ2+φ3. Where the angle φ2 is between 10°-80° preferably 45° and the angle φ3 is between 70°-110°. The angles are defined relative to the plane of the 2D shade. This tilts also the focus area 61' of the imaging sensor so that it is not parallel with the measured object. The reference shade 23 with shading pattern is set so that the imaging sensor can detect the shading pattern within the focus area. A light source 22 is set at an angle φ2 so that it is at an angle φ3 towards the imaging sensor, providing light to the shade and measured object behind the shade. The light source must provide, with possible addition of optics, light beam at an angle φ4 that is at least 5°. The angle of the beam depends on the distance between the light source and the shade 23. The wider the beam is the greater shadow the shading pattern forms and that eases the detection of the shadow and further measurements. Since the imaging sensor is at an angle towards the measured object, the measured object is not in focus area as a whole, but only a slice of the measured object is in focus. However due to the substantially right angle φ3 with the light source 22 and focal length 17' the shadows are always sharp on the surface 21 of the measured object.

The measurement device can be a combination of two optical sensor modules 10 with imaging sensor focus area set to fully cover the measured object. It may be done with two modules 20 with tilted imaging sensor focus area set to cover only part of the measured object. The measurement device can also be a combination of these. Each of the approaches has its benefits. A device with two full focus covering modules 10 provides a good accuracy for planar distance measurement on both sides. A device with modules 20 with tilted focus areas that cover only part of the measured object provide larger measurement range in z direction. This way the distance between the modules can be large and the measured object may move on y direction. When the measurement device has different modules on different sides of the measured object, the accurate planar measurement on one side is combined with large range in other side. This way the modules can have a larger distance with good accuracy.

FIG. 3 shows a frame 31 used in paper and board making industry. The frame is attached around the measured object 30 that can be web of paper or board so that the web goes through the frame. There are two sensor carriages 32, 33 attached to the frame so that they traverse in x axis. The first optical sensor module 10 is attached into one of the sensor carriages 32. The other sensor carriage 33 have another optical sensor module 20. The distance from first surface 11 to first module 10 is measured and the distance from second surface 12 to the second module 20 is measured. The distance between first and second module is measured and the thickness of the web is calculated by subtracting the first measured distances from the distance between modules. The distance between carriages may differ in z axis while the carriages traverse in x axis. This change is typically in the scale of millimeters or less.

It is not mandatory to pre-define the point where the distance measurement begins. Any point within optical sensor module 10 can be considered the starting point e.g. the level of the shade 13, 23. It is however important to calibrate the measurement device so that the distance between the modules is determined and accurate measurements are possible to do. The calibration can be done using thin objects with known thickness. The calibration may also need moving the measured object in z axis to find the changes shadow positions. Once the extremes are calibrated, the mid-values can be interpolated since the measurement principle is linear. On contrary the calibration may also be done with one point extrapolating the edge values.

The thickness measurement needs a proper positioning for optical sensor modules. The distance measurement made in both sides of the web must be done substantially in same x,y position. This positioning can be done with different methods. The main method is related to the frame control and the way how the frame keeps the sensor carriages 32, 33 on synchronized movement. This is typically sufficient. A more detailed control can be done with e.g. magnetoresistive measurement, where magnetoresistor bridge provides accurate information of the deviation in x,y plane.

The distance measurement 29 between optical sensor modules can be done with different methods. An exemplary method is an electromagnetic measurement described in U.S. Pat. No. 4,160,204. Other exemplary methods could be acoustic with ultrasonic measurement or inductive with eddy current based measurement. Example of eddy current measurement is described in FI111991. If the distance 29 stays fixed it can be measured once and stored into memory of computing equipment 16.

The thickness measurement of fast moving web requires very accurate time synchronization for the measurement of the distance on both sides 11, 12 of the web and the distance 29 between optical sensor modules 10, 20. The synchronization of the distance measurements on both sides 11, 12 must be within 0.1 ms to enable the measurement to catch the thickness of same square millimeter, when the web traverses 30 m/s. This synchronization is easy to accomplish since the measurement is based on lighting the object simultaneously from both sides for measurement. Accurate lighting synchronization between multiple light sources is known technology.

FIG. 4 shows the image captured by the imaging sensor from the measurement area A. The shade is done using parallel lines 41 of which each create a shadow 42. The distance between the shades and shadows d1, d2 varies due to thickness, inclination and bending of the measured object. The distance from optical sensor module 10 to the surface 11 in the bottom of the image is shorter than the distance in the top of the image. The spot 43 shown in the image shows a laser light from the opposite of the measured object.

In an embodiment, there are one or more light sources 27 such as lasers attached to the second module 20 so that they illuminate at least one point 43 in the area detected by the imaging sensor 14, 14' on both sides. This spot or a multitude of similar spots or a pattern created by laser can be used to show a common place for distance measurement on both sides of the object 27. The used light sources can be with visual band e.g. red laser, but also in other bands, preferably infrared. If more than one spot is used or the pattern is large enough, the spots or the pattern can be used to reveal tilt of the imaging sensor or optical elements.

FIG. 6 shows a magnified cross section of the measured area. Here the measured planar object 30 is inclined in angle α which must be taken in account when measuring the thickness. The light 62 from light source 12 penetrates through the reference shade 13 and the shadowing pattern 13' creates shadows on the surface 11 of the measured object. The reference shade and shadows are detected with the imaging sensor above. The detected differences d3, d4, d5 can be calculated to the real distances d3', d4', d5'. The light 63 coming from light source 22 passes partly the reference shade 23 and creates a shadow pattern to the surface 21. Additionally, a laser 27 creates a beam 64 and light a spot that can be seen from both sides of the object 30.

FIGS. 7a and 7b show the image on the imaging sensor with a device such as in FIG. 8. FIG. 7a show the image while the surface 11 is close to the shade 23" and the FIG. 7b show the image while the surface 11 is far from the shade 23". The shadow s2 extends while the distance to the measured surface increases. The focused area 73, 73' moves respectively. The images also show the focused area 75, 75' on the opposite side of the measured object that moves respectively. A common focused area 74 that is in focus for imaging sensors on both sides is also marked.

FIG. 8 shows a thickness measurement device with two optical sensor modules 10', 20. The modules may be alike, but the second module is turned 90 degrees in z axis. This provides a way to distinguish inclination of the measured object in both axis x, y. Both modules are explained as with FIG. 2 second module 20 description. The biggest difference is with processing arrangement. The computing equipment in second module 20 is only calculating the distance between 19 the module and the surface 21 providing this information to first module 10' computing equipment 16, for calculating the thickness of the object. The modules may be strictly parallel to each other, but if they are slightly, i.e. <5° inclined in x or y axis, it can be compensated with calibration process.

The invention provides a new way to contactless thickness measurement for thin planar objects. The invented approach minimizes the effect of heat expansion and vibration, since the relative distance between shade and shadow stays comparatively stable even if there are minor movements with light source or imaging sensor. Also, optical unlinearities or misalignment of light sources do not affect relative distance between shade and shadow in current measurement arrangement.

The invention claimed is:

1. A measuring device for measuring a thickness of a planar object, the measuring device comprising:
a first optical sensor module and a second optical sensor module that are located on opposite sides of the planar object and separated by a known mutual distance, each of the optical sensor modules comprising:
a light source set to an angle towards the planar object;
a reference shade with a two dimensional pattern, the reference shade being set between the light source and the planar object so that a shadow is formed on a surface of the planar object; and
an imaging sensor set so that it can detect the reference shade and the shadow simultaneously; and
computing equipment configured to:
for each of the optical sensor modules, calculate a distance between the surface of the planar object and the optical sensor module from a distance between the detected reference shade and the detected shadow; and
calculate the thickness of the planar object by subtracting the distances between each surface of the planar object and each optical sensor module from the known mutual distance between the optical sensor modules.

2. The device according to claim 1, where the reference shades are comprised of elements that are located substantially parallel to the planar object.

3. The device according to claim 1, where the light sources provide light pulses with intervals of 5-100 ms and durations of 0.1-100 µs.

4. The device according to claim 1, wherein at least one of the first and second optical sensor modules comprises multiple light sources with different wavelengths arranged to light the reference shade and planar object from different orientations in an x,y plane.

5. The device according to claim 1, wherein at least one of the first and second optical sensor modules comprises multiple light sources with different wavelengths arranged to light the reference shade and planar object from different angles.

6. The device according to claim 1, further comprising an optical, magnetic, eddy current and/or ultrasonic mutual sensor pair for determining the known mutual distance between the optical sensor modules.

7. The device according to claim 1, wherein for at least one of the optical sensor modules, the imaging sensor, with or without additional optical elements, is arranged so that it can detect the reference shade and the shadow simultaneously within its focus area.

8. A method for measuring a thickness of a planar object, the method comprising:
providing a first optical sensor module having a first light source, a first shade, and a first imaging sensor;
forming a first shadow on a first surface of the planar object using the first light source and the first shade;
detecting simultaneously the first shadow and the first shade with the first imaging sensor;
measuring a distance between the first shade and the first shadow using computing equipment;
converting the distance between the first shade and the first shadow to a first distance between the first optical sensor module and the first surface of the planar object;
providing a second optical sensor module having a second light source, a second shade, and a second imaging sensor;
forming a second shadow on a second surface of the planar object using the second light source and the second shade;
detecting simultaneously the second shadow and the second shade with the second imaging sensor;
measuring a distance between the second shade and the second shadow using the computing equipment;
converting the distance between the second shade and the second shadow to a second distance between the second optical sensor module and the second surface of the planar object;
determining a distance between the first and second optical sensor modules; and
determining the thickness of the planar object with the computing equipment by subtracting the first and second distances from the distance between the first and second optical sensor modules.

9. The method according to claim 8, wherein the planar object is paper, tissue, board or web.

10. The method according to claim 8, further comprising: determining the distance between the first and second optical sensor modules by means of at least one of electromagnetic, inductive or ultrasonic sensors.

11. The method according to claim 8, wherein calibration data is used to convert the distance between the first shade and the first shadow to the first distance.

12. The method according to claim 8, wherein the first optical sensor module has a laser, further comprising:
   using the laser to illuminate a dot on the planar object; and
   detecting a position of the dot with both the first and second imaging sensors.

13. The method according to claim 8, wherein a focal length of the first imaging sensor, with or without additional optical elements, at least partly covers the first surface of the planar object.

\* \* \* \* \*